US010721674B2

(12) United States Patent
Kawanishi

(10) Patent No.: US 10,721,674 B2
(45) Date of Patent: Jul. 21, 2020

(54) INFORMATION PROCESSING APPARATUS THAT IDENTIFIES EXACT DISTANCE TO TRANSMITTING APPARATUS, CONTROL METHOD THEREFOR, AND STORAGE MEDIUM

(71) Applicant: CANON KABUSHIKI KAISHA, Tokyo (JP)

(72) Inventor: Masaki Kawanishi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 361 days.

(21) Appl. No.: 15/607,772

(22) Filed: May 30, 2017

(65) Prior Publication Data
US 2017/0353909 A1 Dec. 7, 2017

(30) Foreign Application Priority Data
Jun. 6, 2016 (JP) .................. 2016-112532

(51) Int. Cl.
H04W 40/24 (2009.01)
H04W 4/80 (2018.01)
H04W 4/029 (2018.01)
H04W 4/021 (2018.01)
H04W 4/02 (2018.01)

(52) U.S. Cl.
CPC ......... *H04W 40/244* (2013.01); *H04W 4/021* (2013.01); *H04W 4/023* (2013.01); *H04W 4/029* (2018.02); *H04W 4/80* (2018.02)

(58) Field of Classification Search
CPC ..... H04W 40/244; H04W 4/80; H04W 4/029; H04W 4/021; H04W 4/023

USPC ......................................... 342/125
See application file for complete search history.

(56) References Cited

U.S. PATENT DOCUMENTS

| 2007/0188375 | A1* | 8/2007 | Richards | G01S 11/06 342/125 |
| 2015/0193981 | A1* | 7/2015 | Watanabe | H04W 4/021 345/633 |
| 2015/0205947 | A1* | 7/2015 | Berman | A61B 5/0031 726/16 |

FOREIGN PATENT DOCUMENTS

| JP | 2009276866 A | 11/2009 |
| JP | 2013146048 A | 7/2013 |
| WO | 2016052583 A1 | 4/2016 |

OTHER PUBLICATIONS

Machine translation of specification of JP2013146048 (Year: 2013).*
(Continued)

*Primary Examiner* — Frank J McGue
(74) *Attorney, Agent, or Firm* — Rossi, Kimms & McDowell LLP

(57) ABSTRACT

An information processing apparatus which is capable of identifying an exact distance to a transmitting apparatus. A received radio wave intensity is measured when a radio wave transmitted from a transmitting apparatus via a short-range wireless communication is received, and a distance to the transmitting apparatus is identified based on a distance management table in which the received radio wave intensity and a distance associated with the received radio wave intensity are managed. A received radio wave intensity at a reference position a predetermined distance away from the transmitting apparatus is measured. The distance management table is calibrated based on the measured received radio wave intensity at the reference position.

8 Claims, 13 Drawing Sheets

(56) References Cited

OTHER PUBLICATIONS

Office Action issued in Japanese Appln. No. 2016-112532 dated Jun. 8, 2020.

* cited by examiner

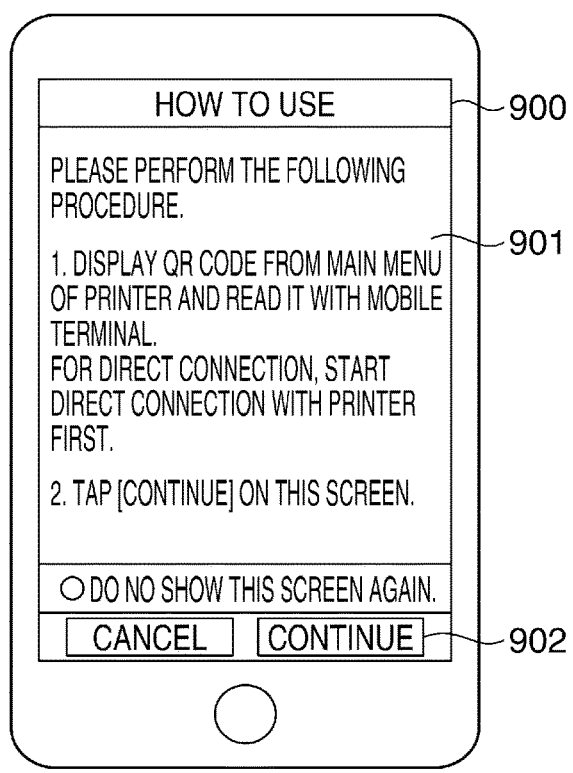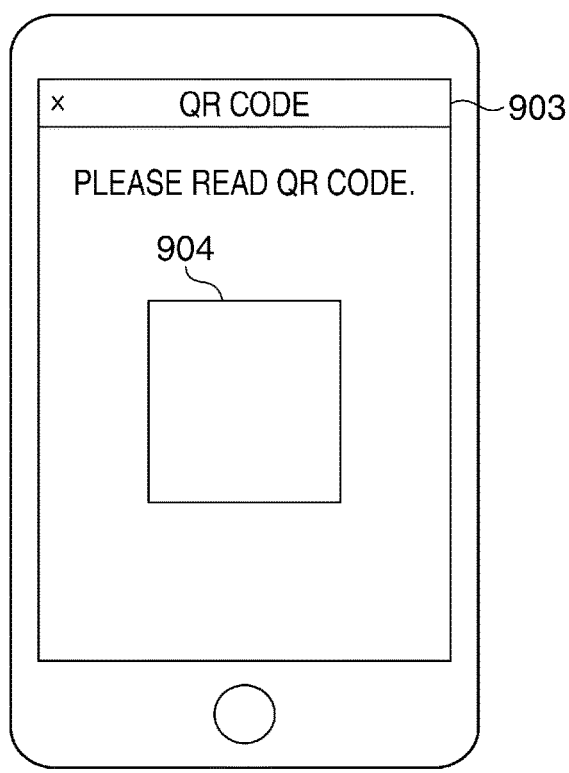

*FIG. 10*

1001 — DEVICE NAME: DeviceA
1002 — MAC ADDRESS: XX-XX-XX-XX-XX-XX
1003 — IP ADDRES: YYY.YYY.YYY.YYY
1004 — DATE AND TIME: 2015/06/26 16:21

INFORMATION PROCESSING APPARATUS THAT IDENTIFIES EXACT DISTANCE TO TRANSMITTING APPARATUS, CONTROL METHOD THEREFOR, AND STORAGE MEDIUM

BACKGROUND OF THE INVENTION

Field of the Invention

The present invention relates to an information processing apparatus, a control method therefor, and a storage medium.

Description of the Related Art

There is known a mobile terminal which is an information processing apparatus which receives a radio wave, and more specifically, an advertising packet transmitted from an MFP, which is a transmitting apparatus, and carries out a BLE (Bluetooth low energy) communication based on the advertising packet. When, for example, a user who holds the mobile terminal moves a predetermined distance away from the MFP with an original left on the MFP after operating the MFP, the mobile terminal notifies the user that he or she forgot to remove the original (see, for example, Japanese Laid-Open Patent Publication (Kokai) No. 2013-146048).

Upon receiving a radio wave transmitted from the MFP via BLE communication, the mobile terminal measures a radio wave intensity of the received radio wave (hereafter referred to as a "received radio wave intensity") and identifies a distance to the MFP based on the measured received radio wave intensity. The mobile terminal stores in advance a distance management table in which distances prescribed for respective received radio wave intensities are managed, extracts a distance associated with the measured received radio wave intensity from the distance management table, and identifies the extracted distance as a distance to the MFP.

However, there may be a case where the mobile terminal cannot identify an exact distance to the transmitting apparatus. For example, a reception sensitivity of the mobile terminal changes due to installation of an accessory or the like, and this causes an error in a measured received radio wave intensity measured by the mobile terminal. When there is an error in a measured received radio wave intensity, a distance that is different from an actual distance to the transmitting apparatus is extracted from the distance management table, and as a result, the mobile terminal cannot identify an exact distance to the transmitting apparatus.

SUMMARY OF THE INVENTION

The present invention provides an information processing apparatus and a control method therefor, which are capable of identifying an exact distance to a transmitting apparatus, as well as a storage medium.

Accordingly, the present invention provides an information processing apparatus that measures a received radio wave intensity when a radio wave transmitted from a transmitting apparatus through a short-range wireless communication is received, and identifies a distance to the transmitting apparatus based on a distance management table in which the received radio wave intensity and a distance associated with the received radio wave intensity are managed, comprising a measuring unit configured to measure the received radio wave intensity at a reference position a predetermined distance away from the transmitting apparatus, a calibration unit configured to calibrate the distance management table based on the received radio wave intensity at the reference position.

According to the present invention, an exact distance to a transmitting apparatus is identified.

Further features of the present invention will become apparent from the following description of exemplary embodiments (with reference to the attached drawings).

BRIEF DESCRIPTION OF THE DRAWINGS

FIGS. 9A and 9B are views showing exemplary setting screens which are displayed on the mobile terminal in FIG. 1.

FIG. 10 is a view showing a variety of exemplary information included in a QR code (registered trademark) which is displayed on an MFP in FIG. 1.

DESCRIPTION OF THE EMBODIMENTS

Hereafter, an embodiment of the present invention will be described in detail with reference to the drawings.

In the present embodiment described below, the present invention is applied to a mobile terminal which is an information processing apparatus, but the present invention should not always be applied to the mobile terminal but may be applied to any apparatus as long as it is capable of carrying out communications with a transmitting apparatus using short-range wireless communication.

Figure 1:
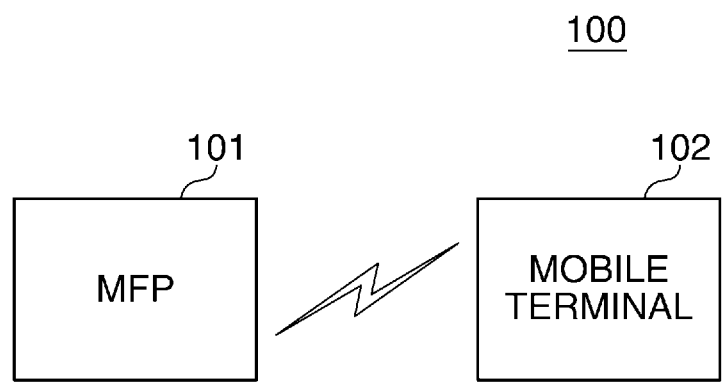
FIG. 1 is a block diagram schematically showing an arrangement of a communication system including a mobile terminal which is an information processing apparatus according to an embodiment of the present invention.

FIG. 1 is a block diagram schematically showing an arrangement of a communication system 100 including the mobile terminal 102 which is an information processing apparatus according to the present embodiment.

Referring to FIG. 1, the communication system 100 has an MFP 101, which is a transmitting apparatus, and the mobile terminal 102.

The MFP 101 has a short-range wireless communication function of carrying out communications using BLE, NFC (Near Field Communication), and so forth, and a wireless LAN communication function of carrying out wireless communications using Wi-Fi. For example, the MFP 101 transmits a radio wave such as an advertising packet through communication using BLE at predetermined time intervals. An advertising packet includes identification information which identifies the MFP 101, such as a device name, a MAC address, and an IP address of the MFP 101. The mobile terminal 102 has a short-range wireless communication function and a wireless LAN communication function, and for example, upon receiving an advertising packet transmitted from the MFP 101, the mobile terminal 102 obtains identification information on the MFP 101 from the advertising packet. Also, upon receiving a radio wave transmitted from the MFP 101, the mobile terminal 102 measures a received radio wave intensity, and based on the measured received radio wave intensity, identifies a distance to the MFP 101.

Figure 2:
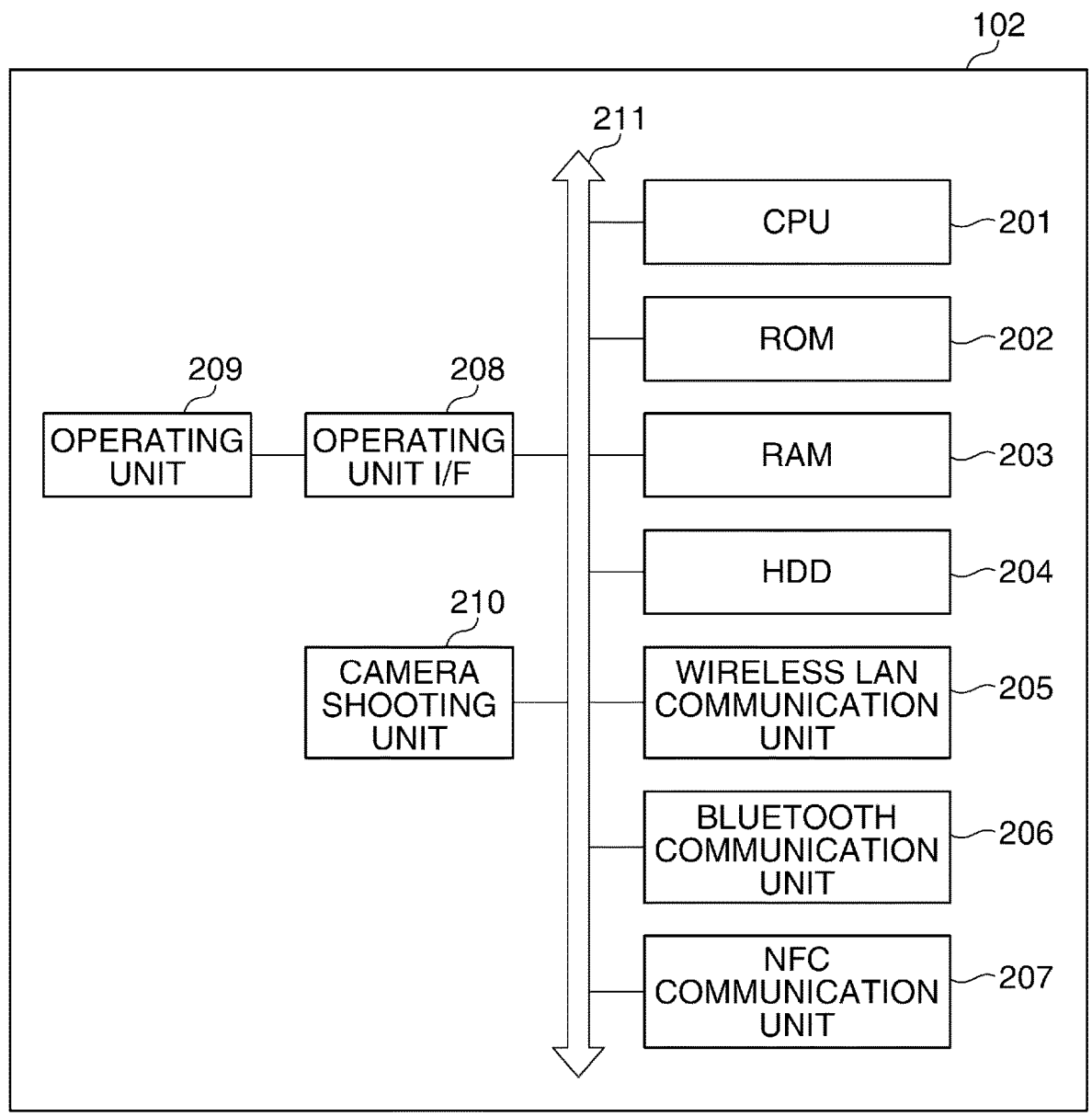
FIG. 2 is a block diagram schematically showing a hardware arrangement of the mobile terminal in FIG. 1.

FIG. 2 is a block diagram schematically showing a hardware arrangement of the mobile terminal 102 in FIG. 1.

Referring to FIG. 2, the mobile terminal 102 has a CPU 201, a ROM 202, a RAM 203, an HDD 204, a wireless LAN communication unit 205, a Bluetooth (registered trademark) communication unit 206, an NFC communication unit 207, an operating unit I/F 208, an operating unit 209, and a camera shooting unit 210. The CPU 201, the ROM 202, the RAM 203, the HDD 204, the wireless LAN communication unit 205, the Bluetooth communication unit 206, the NFC communication unit 207, the operating unit I/F 208, and the camera shooting unit 210 are connected to one another via a system bus 211. The operating unit 209 is connected to the operating unit I/F 208.

Figure 6A:
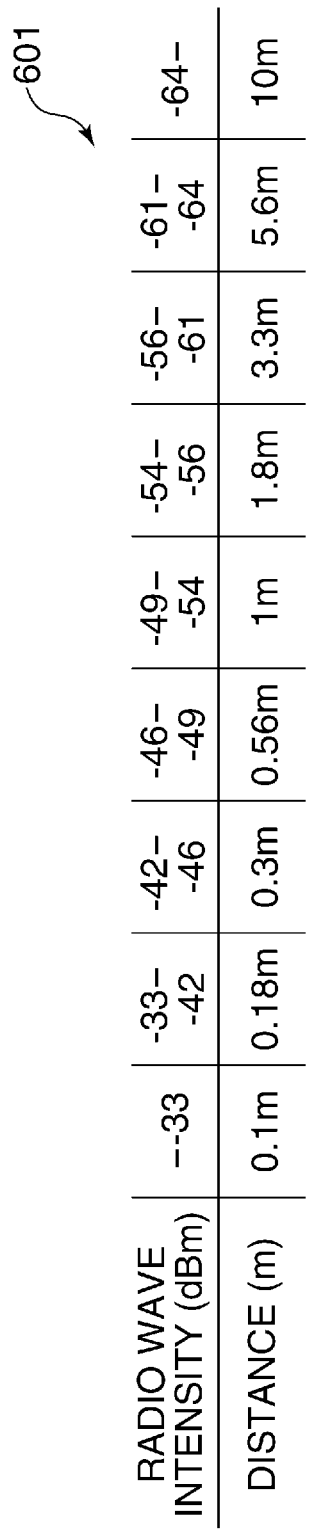
FIGS. 6A and 6B are views showing exemplary distance management tables which are used by the mobile terminal in FIG. 1.

The CPU 201 centrally controls the mobile terminal 102. The ROM 202 stores programs, which are to be executed by the CPU 102, and a variety of data. The RAM 203 is used as a work area for the CPU 102 and also used as a temporary storage area for a variety of data. The HDD 204 stores a variety of data which is to be used by the CPU 102. In the present embodiment, the HDD 204 stores a distance management table in FIG. 6A, to be described later, for identifying a distance to the MFP 101 based on the measured received radio wave intensity. The wireless LAN communication unit 205 controls wireless LAN communications with the MFP 101 and others. The Bluetooth communication unit 206 receives radio waves transmitted from the MFP 101 and controls BLE communications with the MFP 101. The Bluetooth communication unit 206 also measures the received radio wave intensity. The NFC communication unit 207 controls NFC commutations with the MFP 101. The operating unit I/F 208 carries out data communications with the operating unit 209.

Figure 3:
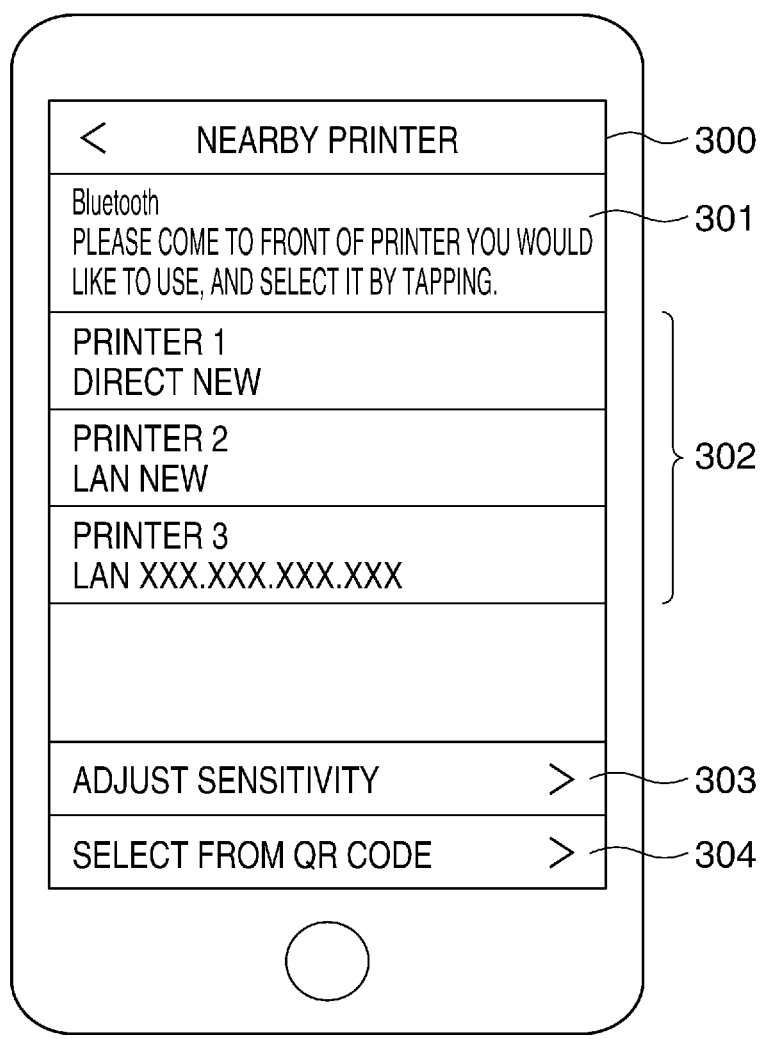
FIG. 3 is a view showing an exemplary setting screen which is displayed on the mobile terminal in FIG. 1.

The operating unit 209, which is a user interface of the mobile terminal 102, has a liquid crystal display unit and a software keyboard, not shown, having a touch panel function and displays a variety of screens. For example, the operating unit 209 displays a setting screen 300 in FIG. 3 for setting a destination of a BLE communication. The setting screen 300 has a message 301, transmitting apparatus information 302, a sensitivity adjustment menu 303, and a QR code selection menu 304. The message 301 shows details of an operation for establishing connection with transmitting apparatuses, which are displayed in the transmitting apparatus information 302, via BLE communication. The transmitting apparatus information 302 shows information on transmitting apparatuses which are sources of advertising packets received by the Bluetooth communication unit 206. Information on transmitting apparatuses includes names of transmitting apparatuses, connection methods such as wireless direct connection or wireless LAN connection, and connection history information indicating whether or not the mobile terminal 102 has connected to those transmitting apparatuses in the past. The mobile terminal 102 configures connection settings as to BLE communication with the transmitting apparatus on which the operation described by the message 301 has been performed, for example, the MFP 101 among transmitting apparatuses displayed in the transmitting apparatus information 302. This enables a BLE communication between the MFP 101 and the mobile terminal 102. The sensitivity adjustment menu 303 is a setting menu for adjusting a sensitivity for a process in which a distance associated with the measured received radio wave intensity is identified. When a user selects the sensitivity adjustment menu 303, the mobile terminal 102 carries out a calibration process in FIG. 4, to be described later. The QR code selection menu 304 is a setting menu for reading a QR code displayed on the transmitting apparatus and configuring connection settings as to a BLE communication with the transmitting apparatus. The camera shooting unit 210 shoots an image, and for example, shoots a QR code displayed on the MFP 101 to read a variety of information from the QR code.

Figure 4:
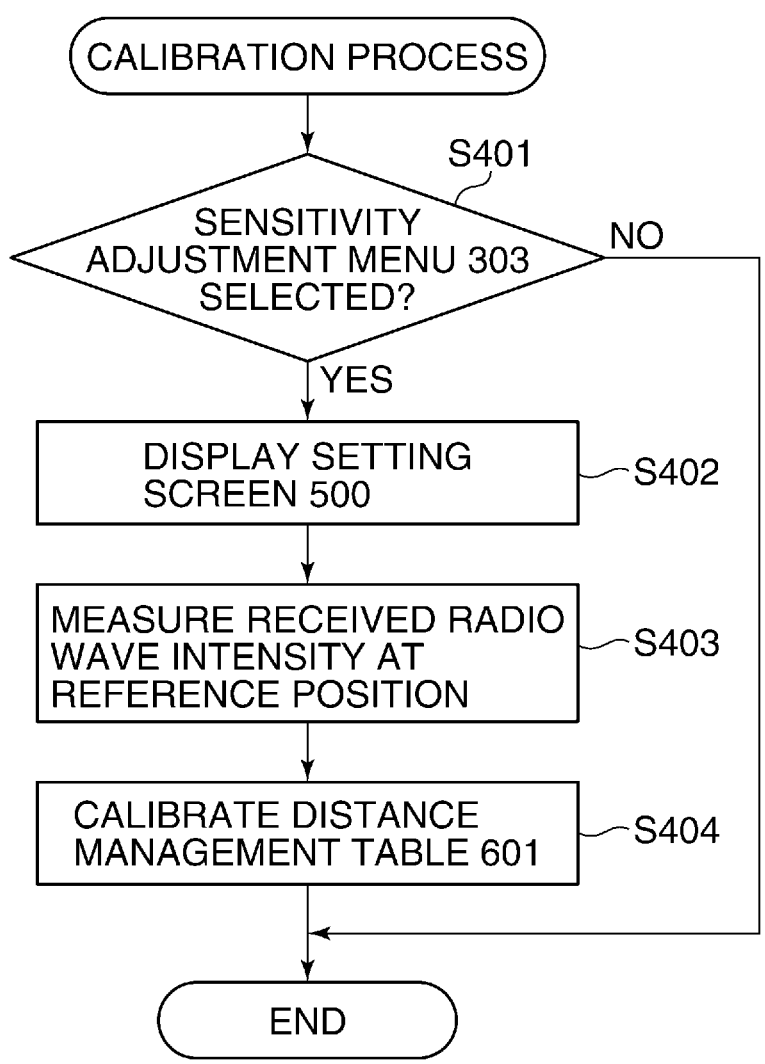
FIG. 4 is a flowchart showing the procedure of a calibration process which is carried out by the mobile terminal in FIG. 1.

FIG. 4 is a flowchart showing the procedure of the calibration process which is carried out by the mobile terminal 102 in FIG. 1.

The process in FIG. 4 is carried out by the CPU 201 executing a program stored in the ROM 202 or the like and is carried out when the mobile terminal 102 has received the advertising packet transmitted from the MFP 101.

Referring to FIG. 4, first, the CPU 201 displays the setting screen 300 and determines whether or not the user has selected the sensitivity adjustment menu 303 (step S401).

Figure 5A:
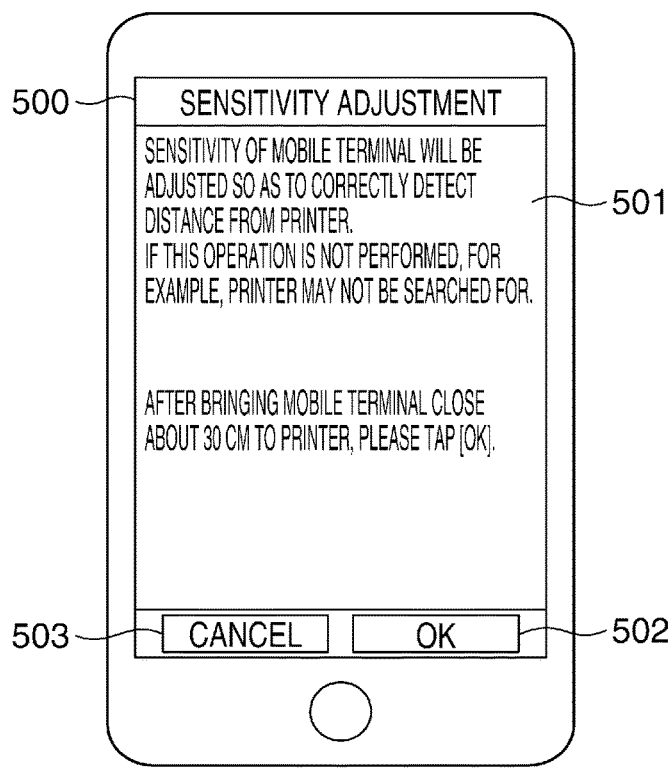
FIGS. 5A to 5C are views showing exemplary setting screens which are displayed on the mobile terminal in FIG. 1.

As a result of the determination in the step S401, when the sensitivity adjustment menu 303 has not been selected, the CPU 201 ends the present process. On the other hand, as a result of the determination in the step S401, when the sensitivity adjustment menu 303 has been selected, the CPU 201 displays a setting screen 500 in FIG. 5A (step S402). The setting screen 500 has a message 501, an OK button 502, and a cancel button 503. The message 501 includes instruction information about an operation on the mobile terminal 102 required to adjust sensitivity. Specifically, an instruction to adjust a position of the mobile terminal 102 to a reference position at a predetermined distance of, for example, 30 cm from the MFP 101 is displayed in the message 501. The OK button 502 is a setting button for issuing an instruction to start measuring the received radio wave intensity of the radio wave transmitted from the MFP 101. The cancel button 503 is a setting button for issuing an instruction to cancel execution of sensitivity adjustment.

Figure 6B:
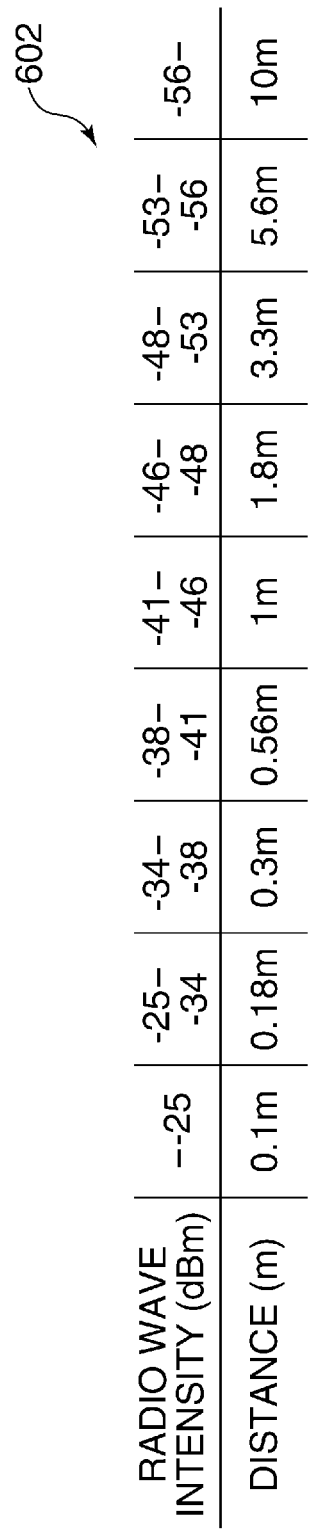

When the user adjusts a position of the mobile terminal 102 to the reference position and selects the OK button 502, the CPU 201 measures a received radio wave intensity at the reference position (step S403). Then, based on the measured received radio wave intensity at the reference position, the CPU 201 calibrates a distance management table 601 in FIG. 6A (step S404). The distance management table 601 is a table in which distances prescribed for respective received radio wave intensities are managed and which is stored in the HDD 204 in advance. In the following description of the calibration process for the distance management table 601 in the step S404, it is assumed that, for example, a position at which the mobile terminal 102 is 30 cm away from the MFP 101 is the reference position, and a received radio wave intensity at the reference position is −38 dBm. In this case, for example, a calibration value −8 dBm is derived by subtracting −38 dBm from −46 dBm among radio wave intensities −42 dBm to −46 dBm associated with the distance of 30 cm. The CPU 201 subtracts the calibration value −8 dBm from all of the radio wave intensities in the distance management table 601 to generate a calibrated distance management table 602 in FIG. 6B, and stores and holds the calibrated distance management table 602 in the HDD 204. Namely, in the present embodiment, the distance management table 601 is calibrated according to a reception sensitivity of the mobile terminal 102. After that, the CPU 201 ends the present process.

A description will now be given of a process in which the mobile terminal 102 identifies a distance to the MFP 101 based on the measured received radio wave intensity.

Figure 7:
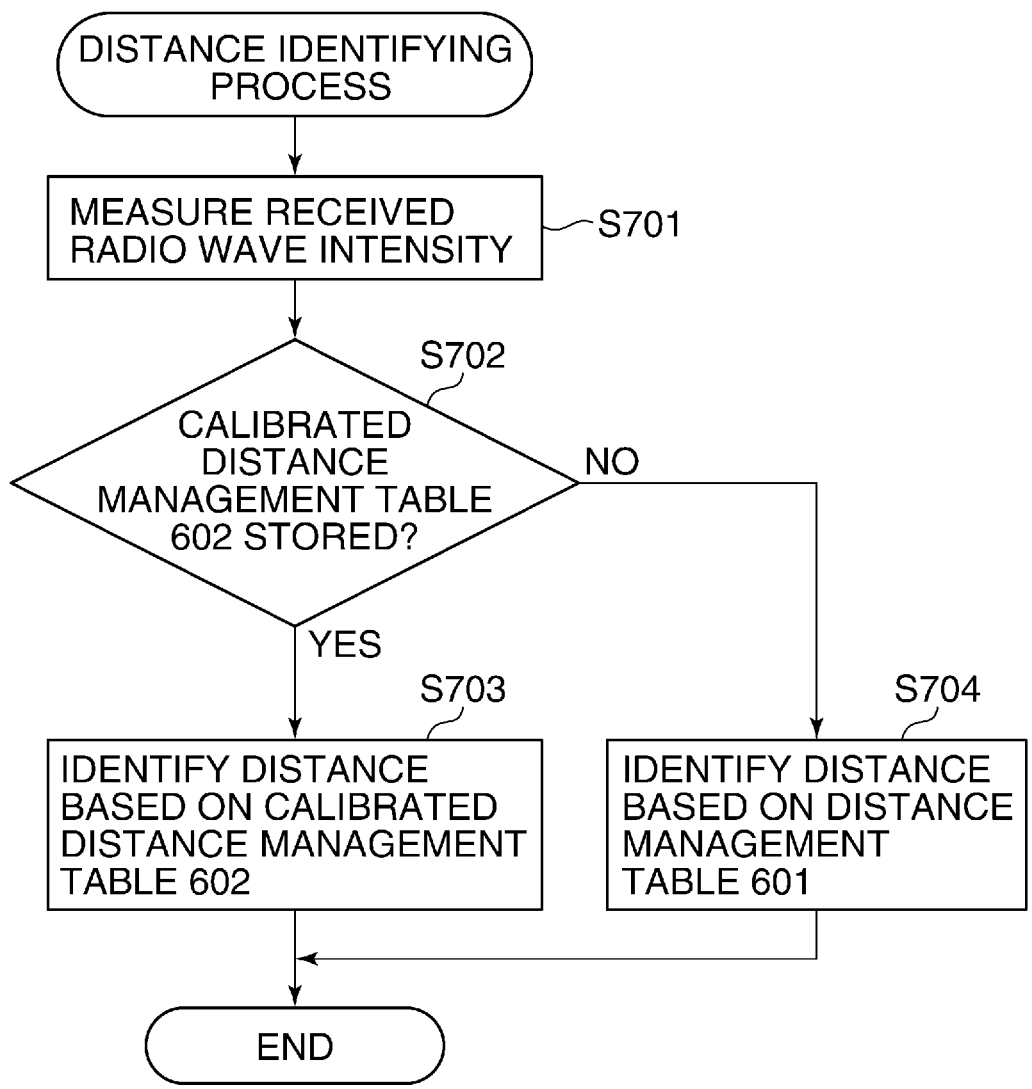
FIG. 7 is a flowchart showing the procedure of a distance identifying process which is carried out by the mobile terminal in FIG. 1.

FIG. 7 is a flowchart showing the procedure of a distance identifying process which is carried out by the mobile terminal 102 in FIG. 1.

The process in FIG. 7 is carried out by the CPU 201 executing a program stored in the ROM 202 or the like and is carried out when the mobile terminal 102 has received the advertising packet transmitted from the MFP 101.

Referring to FIG. 7, first, upon receiving the advertising packet transmitted from the MFP 101, the CPU 201 measures the received radio wave intensity (step S701). Next, the CPU 201 determines whether or not the calibrated distance management table 602 is stored in the HDD 204 (step S702).

As a result of the determination in the step S702, when the calibrated distance management table 602 is stored in the HDD 204, the CPU 201 identifies a distance to the MFP 101 based on the measured received radio wave intensity and the calibrated distance management table 602 (step S703). For example, when the measured received radio wave intensity is −38 dBm, the CPU 201 extracts "0.3 m", which is a distance associated with the measured received radio wave intensity, from the calibrated distance management table 602 and identifies the extracted "0.3 m" as the distance to the MFP 101. After that, the CPU 201 ends the present process. On the other hand, as a result of the determination in the step S702, when the calibrated distance management table 602 is not stored in the HDD 204, the CPU 201 identifies the distance to the MFP 101 based on the received radio wave intensity and the distance management table 601 (step S703) and ends the present process.

According to the processes in FIGS. 4 and 7 described above, the distance management table 601 is calibrated based on the radio wave intensity measured by the mobile terminal 102 at the reference position. Namely, the distance management table 601 is calibrated according to the reception sensitivity of the mobile terminal 102. As a result, even when a reception sensitivity of the mobile terminal 102 has changed due to installation of an accessory or the like, an exact distance to the transmitting apparatus is found.

Moreover, in the processes in FIGS. 4 and 7 described above, since instruction information about an operation on the mobile terminal 102 required to adjust sensitivity is displayed when sensitivity is to be adjusted, the user easily adjusts sensitivity.

Although the present invention has been described by way of the embodiment, the present invention should not be limited to the embodiment described above.

Figure 5B:
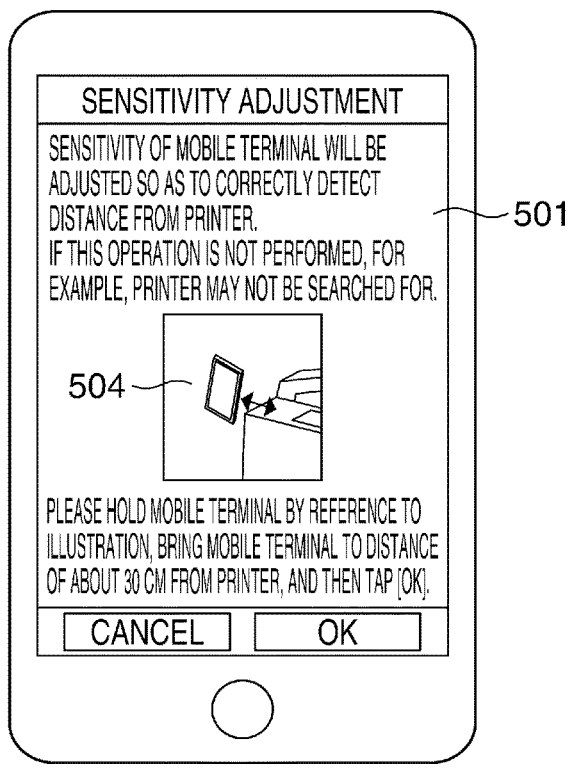
Figure 5C:
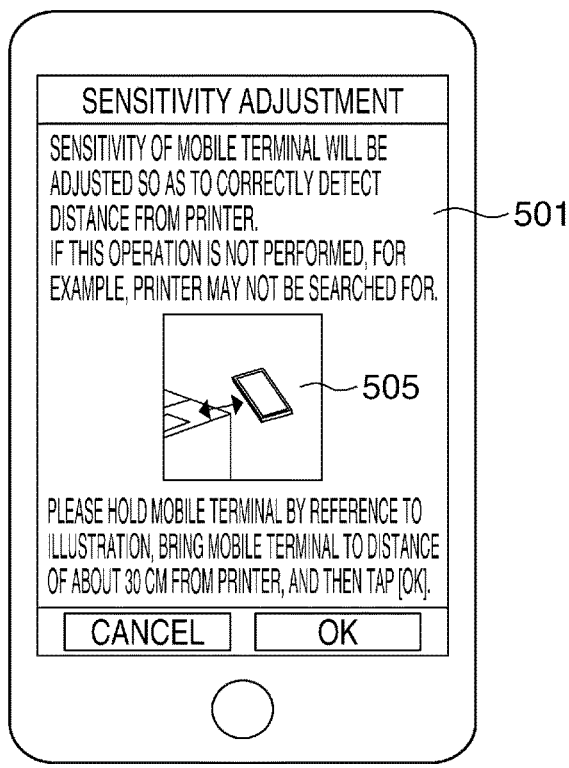

For example, the mobile terminal 102 may include an image in the message 501 so that the user can easily recognize the reference position. Based on identification information on the MFP 101 included in the received advertising packet, the CPU 201 identifies a configuration of the MFP 101. For example, when the MFP 101 is configured to be equipped with a BLE chip, not shown, which transmits the radio wave via BLE communication, on a left side of the MFP 101, an image 504 showing that the mobile terminal 102 being adjusted to the left side of the MFP 101 is included in the message 501 as shown in FIG. 5B. When the MFP 101 is configured to be equipped with the BLE chip on a right side of the MFP 101, an image 505 showing the mobile terminal 102 being adjusted to the right side of the MFP 101 is included in the message 501 as shown in FIG. 5C.

In the embodiment described above, an instruction to place the mobile terminal 102 in a predetermined area, for example, on the operating unit 209 which is located at a distance of 30 cm from the BLE chip may be provided as instruction information about an operation on the mobile terminal 102 required to adjust sensitivity.

Moreover, in the embodiment described above, the MFP 101 may have a projection corresponding to a distance at the reference position or a measure for measuring a distance at the reference position.

Furthermore, in the embodiment described above, a position at which the mobile terminal 102 reads a QR code displayed on the MFP 101 may be considered as the reference position, and the received radio wave intensity at this reference position may be measured.

Figure 8:
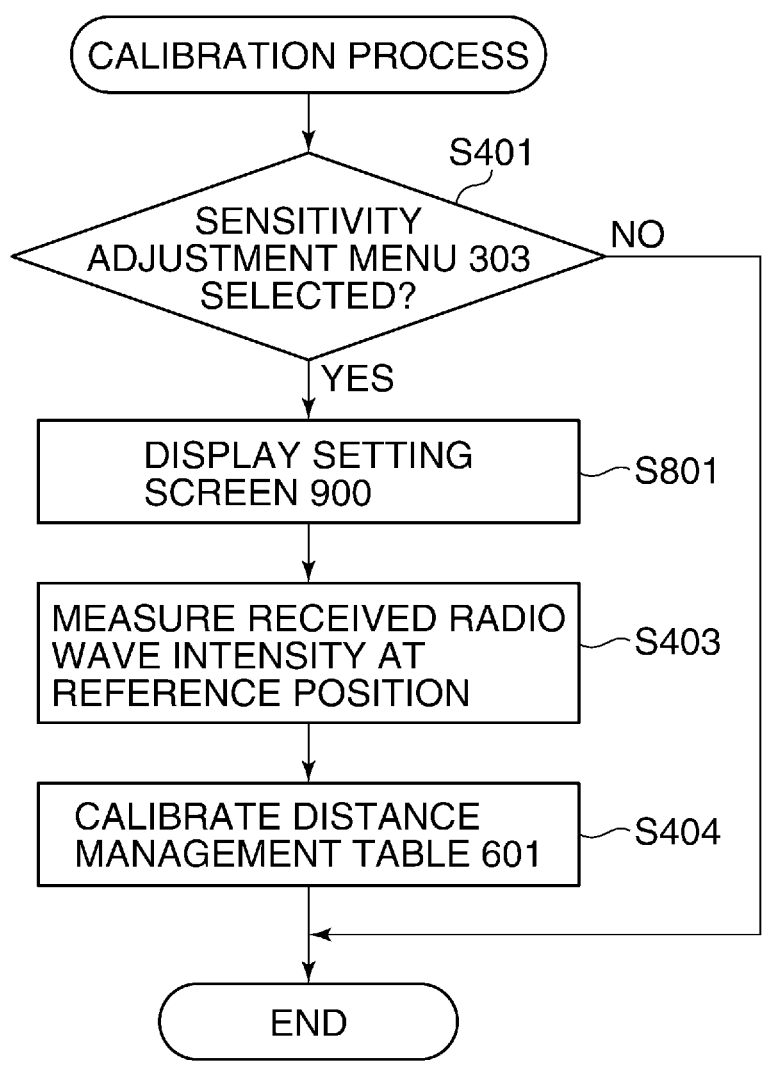
FIG. 8 is a flowchart showing the procedure of a first variation of the calibration process in FIG. 4.

FIG. 8 is a flowchart showing the procedure of a first variation of the calibration process in FIG. 4.

The process in FIG. 8 is carried out by the CPU 201 executing a program stored in the ROM 202 or the like and is carried out when the mobile terminal 102 has received the advertising packet transmitted from the MFP 101.

Here, in the process in FIG. 4, there may be a case where the user erroneously gives an instruction to start measuring the received radio wave intensity at the reference position from a position farther away from the MFP 101 than the reference position (for example, a position at a distance of 30 cm from the MFP 101) indicated by the message 501. In this case, the mobile terminal 102 calibrates the distance management table 601 using the measured received radio wave intensity at a position far enough away from the reference position, for example, a position of 1 m from the MFP 101 as the measured received radio wave intensity at the reference position. Namely, the distance management table 601 is improperly calibrated.

To cope with this, in the present embodiment, a received radio wave intensity at the reference position is measured using a position at which a QR code displayed on the MFP 101 is read as the reference position.

Referring to FIG. 8, first, the CPU 201 carries out the process in the step S401. As a result of the determination in the step S401, when the sensitivity adjustment menu 303 has not been selected, the CPU 201 ends the present process. On the other hand, as a result of the determination in the step S401, when the sensitivity adjustment menu 303 has been selected, the CPU 201 displays a setting screen 900 in FIG. 9A (step S801). The setting screen 900 includes a message 901 and an operating button 902. The message 901 includes instruction information about an operation on the mobile terminal 102 required to adjust sensitivity. Specifically, the message 901 includes an instruction to display a QR code on the MFP 101 and read the QR code with the mobile terminal 102. The operating button 902 are setting button for giving an instruction to display a QR code reading screen 903 in FIG. 9B for reading the QR code. The QR code reading screen 903 includes a QR code reading frame 904. When the user adjusts a position of the mobile terminal 102 so that the QR code displayed on the MFP 101 can fit within the QR code reading frame 904, the mobile terminal 102 reads the QR code to obtain a variety of information from the QR code. The QR code includes, for example, a device name 1001, MAC address information 1002, IP address information 1003, and QR code generation date and time information 1004 in FIG. 10. The CPU 201 then carries out the processes in the step S403 in FIG. 4 and the subsequent processes using a position of the mobile terminal 102 when it read the QR code as the reference position.

In the process in FIG. 8 described above, the received radio wave intensity at the reference position is measured using a position at which the QR code displayed on the MFP 101 is read as the reference position. This prevents the distance management table 601 from being improperly calibrated using the measured received radio wave intensity at a position far enough away from the reference position as the measured received radio wave intensity at the reference position.

In the embodiment described above, the calibrated distance management table 602 may be associated with the MFP 101, and the calibrated distance management table 602 associated with the MFP 101 may be held.

Figure 11:
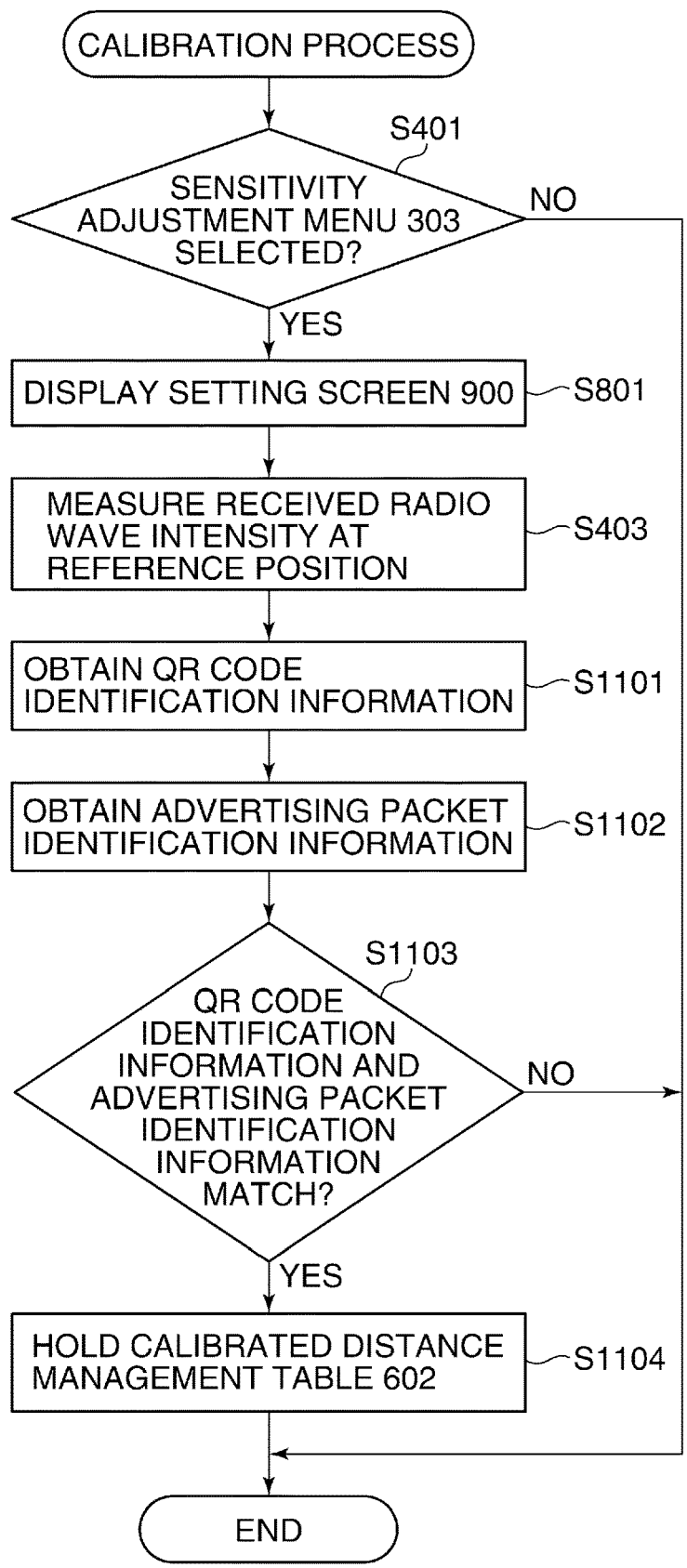
FIG. 11 is a flowchart showing the procedure of a second variation of the calibration process in FIG. 4.

FIG. 11 is a flowchart showing the procedure of a second variation of the calibration process in FIG. 4.

The process in FIG. 11 is carried out by the CPU 201 executing a program stored in the ROM 202 or the like and is carried out when the mobile terminal 102 has received the advertising packet transmitted from the MFP 101.

Referring to FIG. 11, first, the CPU 201 carries out the processes S401, S801, and S403. Next, the CPU 201 obtains identification information on the MFP 101 (hereafter referred to as "the QR code identification information") such as the device name 1001, the MAC address information 1002, and the IP address information 1003 from the QR code (step S1101). Then, the CPU 201 obtains identification information on the MFP 101 (hereafter referred to as "the advertising packet identification information") from the advertising packet transmitted from the MFP 101 (step S1102). The advertising packet identification information includes a device name, a MAC address, an IP address, and so forth of the MFP 101. After that, the CPU 201 determines whether or not the QR code identification information and the advertising packet identification information correspond to, for example, match each other (step S1103).

As a result of the determination in the step S1103, when the QR code identification information and the advertising packet identification information do not match each other, the CPU 201 ends the present process. On the other hand, as a result of the determination in the step S1103, when the QR code identification information and the advertising packet identification information match each other, the CPU 201 calibrates the distance management table 601 based on the measured received radio wave intensity at the reference position to generate the calibrated distance management table 602. Namely, in the present embodiment, only when the QR code identification information and the advertising packet identification information match each other, the CPU 201 calibrates the distance management table 601. After that, the CPU 201 associates the calibrated distance management table 602 with the QR code identification information, stores the calibrated distance management table 602 in the HDD 204, holds the calibrated distance management table 602 (step S1104), and ends the present process.

In the process in FIG. 11 described above, the calibrated distance management table 602 is associated with the QR code identification information, and the calibrated distance management table 602 is held. As a result, when a distance to the MFP 101 is identified after the distance management table 601 is calibrated, the distance is easily identified using the calibrated distance management table 602.

Moreover, in the process in FIG. 11 described above, only when the QR code identification information and the advertising packet identification information correspond to, for example, match each other, the distance management table 601 is calibrated. As a result, an unintended calibration process for the distance management table 601 is prevented from being carried out by reading a QR code other than the QR code displayed on the MFP 101.

In the embodiment described above, when a date and time at which QR data read by the mobile terminal 102 was generated is earlier than a set date and time set in advance, the distance management table 601 does not have to be calibrated.

Figure 12:
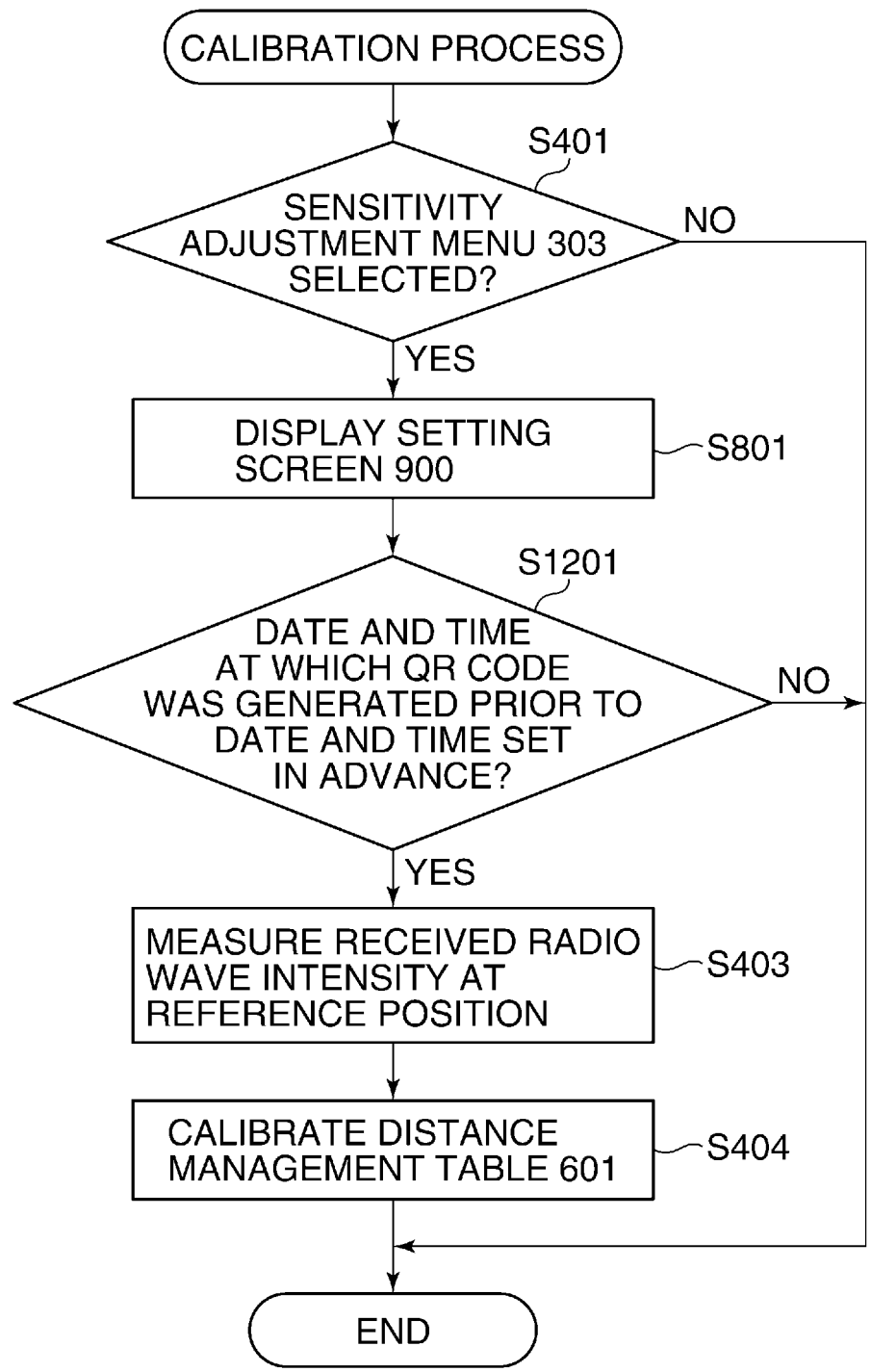
FIG. 12 is a flowchart showing the procedure of a third variation of the calibration process in FIG. 4.

FIG. 12 is a flowchart showing the procedure of a third variation of the calibration process in FIG. 4.

The process in FIG. 12 is carried out by the CPU 201 executing a program stored in the ROM 202 or the like and is carried out when the mobile terminal 102 has received an advertising packet transmitted from the MFP 101.

Referring to FIG. 12, first, the CPU 201 carries out the processes in the steps S401 and S801. Next, the CPU 201 obtains the generation date and time information 1004 on a QR code by shooting the QR code and determines whether or not a date and time at which the QR code was generated is earlier than a set date and time that is set in advance (step S1201). In the present embodiment, a date and time several minutes, for example, three minutes earlier than a date and time at which the QR code is shot is set as the set date and time.

As a result of the determination in the step S1201, when the date and time at which the QR code was generated is earlier than the set date and time, the CPU 201 ends the present process. On the other hand, as a result of the determination in the step S1201, when the date and time at which the QR code was generated is the same as or later than the set date and time, the CPU 201 carries out the processes in the step S403 in FIG. 4 and the subsequent processes using a position of the mobile terminal 102 when it read the QR code as the reference position.

In the process in FIG. 12 described above, when a date and time at which a QR code was generated is earlier than the set date and time, the distance management table 601 is not calibrated. Namely, an expiration date is provided for the QR code. This prevents a situation in which a number of calibrated distance management tables 602 with the same contents are generated by reading the same QR code.

In the embodiment described above, the received radio wave intensity at the reference position may be measured using a position at which a touch operation for carrying out the NFC communication with the MFP 101 was performed on the mobile terminal 102 as the reference position.

Figure 13:
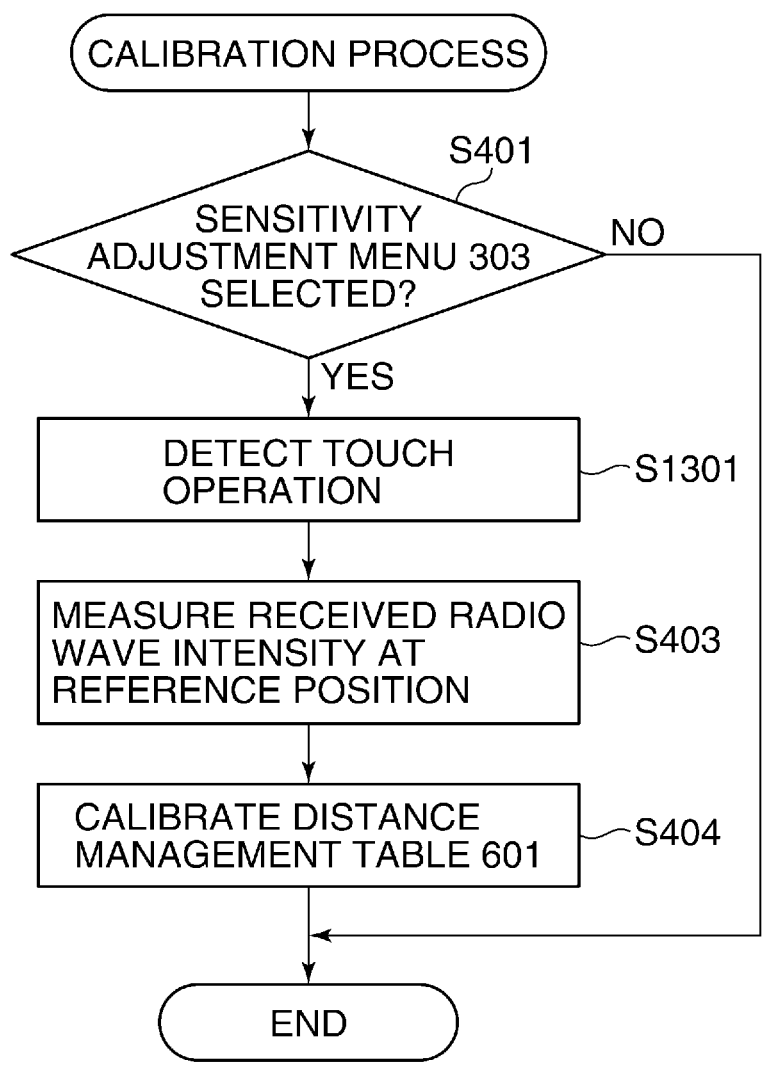
FIG. 13 is a flowchart showing the procedure of a fourth variation of the calibration process in FIG. 4.

FIG. 13 is a flowchart showing the procedure of a fourth variation of the calibration process in FIG. 4.

The process in FIG. 13 is carried out by the CPU 201 executing a program stored in the ROM 202 or the like and is carried out when the mobile terminal 102 has received the advertising packet transmitted from the MFP 101.

Referring to FIG. 13, first, the CPU 201 carries out the process in the step S401. As a result of the determination in the step S401, when the sensitivity adjustment menu 303 has not been selected, the CPU 201 ends the present process. On the other hand, as a result of the determination in the step S401, when the sensitivity adjustment menu 303 has been selected, the CPU 201 stands by until the user performs a touch operation, in which the mobile terminal 102 is brought close to the MFP 101, for example, to a position of 10 cm from the MFP 101, so as to carry out an NFC communication. Upon detecting the touch operation performed by the user (step S1301), the CPU 201 carries out the processes in the step S403 in FIG. 4 and the subsequent processes using a position at which the touch operation was performed as the reference position.

In the process in FIG. 13 described above, the received radio wave intensity at the reference position is measured using a position at which the touch operation was performed as the reference position. As a result, the user easily adjusts a position of the mobile terminal 102 to the reference position without the need to make a delicate positional adjustment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-112532, filed Jun. 6, 2016, which is hereby incorporated by reference herein in its entirety.

What is claimed is:

1. An information processing apparatus that measures a received radio wave intensity when a radio wave transmitted from a transmitting apparatus through a short-range wireless communication is received, and estimates a distance to the transmitting apparatus based on a management table in which the received radio wave intensity and a distance associated with the received radio wave intensity are managed, comprising:
at least one memory that stores a set of instructions; and
at least one processor that executes the instructions to:
control to display a screen containing a display object for receiving instructions to start executing calibration processing;
make a determination whether or not the information processing apparatus is considered to be located at a reference position a predetermined distance away from the transmitting apparatus, without using a received radio wave intensity, at least after accepting the operation to the display object;
upon determining that the information processing apparatus is considered to be located at the reference position, measure a received radio wave intensity being an intensity of a radio wave transmitted from the transmitting apparatus; and
calibrate the management table based on the received radio wave intensity measured at which the information processing apparatus is considered to be located at the reference position.

2. The information processing apparatus according to claim 1 wherein the at least one processor executes the instructions to provide notification of an instruction for an operation on the information processing apparatus required to calibrate the management table.

3. The information processing apparatus according to claim 1, wherein the at least one processor executes the instructions to read a two dimensional code,
wherein in the determination, it is determined that the information processing apparatus is considered to be located at the reference position in a case where reading of the two dimensional code has been done.

4. The information processing apparatus according to claim 3, wherein the at least one processor executes the instructions to:
obtain identification information that identifies the transmitting apparatus from the two dimensional code; and
associate the calibrated management table with the identification information and hold the management table associated with the identification information.

5. The information processing apparatus according to claim 4, wherein the at least one processor executes the instructions to obtain other identification information that identifies the transmitting apparatus from the radio wave transmitted from the transmitting apparatus,
wherein the management table is calibrated only when the identification information and the other identification information correspond to each other.

6. The information processing apparatus according to claim 3, wherein information indicating a date and time at which the two dimensional code was generated is obtained from the two dimensional code, and
the management table is not calibrated when the date and time at which the two dimensional Q-R code was generated is earlier than a set time and date that is set in advance.

7. A calibration method that is implemented by an information processing apparatus that measures a received radio wave intensity when a radio wave transmitted from a transmitting apparatus via a short-range wireless communication is received, and estimates a distance to the transmitting apparatus based on a management table in which the received radio wave intensity and a distance associated with the received radio wave intensity are managed, the calibration method comprising:
controlling to display a screen containing a display object for receiving instructions to start executing calibration processing;

making a determination whether or not the information processing apparatus is considered to be located at a reference position a predetermined distance away from the transmitting apparatus, without using a received radio wave intensity, at least after accepting the operation to the display object;

upon determining that the information processing apparatus is considered to be located at the reference position, measuring a received radio wave intensity being an intensity of a radio wave transmitted from the transmitting apparatus; and calibrating the management table based on the received radio wave intensity measured at which the information processing apparatus is considered to be located at the reference position.

8. A non-transitory computer-readable storage medium storing a program for causing a computer to execute a calibration method that is implemented by an information processing apparatus that measures a received radio wave intensity when a radio wave transmitted from a transmitting apparatus through short-range wireless communication is received, and estimates a distance to the transmitting apparatus based on a management table in which the received radio wave intensity and a distance associated with the received radio wave intensity are managed, the calibration method comprising:

controlling to display a screen containing a display object for receiving instructions to start executing calibration processing;

making a determination whether or not the information processing apparatus is considered to be located at a reference position a predetermined distance away from the transmitting apparatus, without using a received radio wave intensity, at least after accepting the operation to the display object;

upon determining that the information processing apparatus is considered to be located at the reference position, measuring a received radio wave intensity being an intensity of a radio wave transmitted from the transmitting apparatus; and calibrating the management table based on the received radio wave intensity measured at which the information processing apparatus is considered to be located at the reference position.

* * * * *